US012805662B2

(12) United States Patent
Casali

(10) Patent No.: US 12,805,662 B2
(45) Date of Patent: Nov. 24, 2026

(54) COFFEE MACHINE WITH DRIP COFFEE DISPENSING UNIT

(71) Applicant: Gruppo Cimbali S.p.A., Binasco (IT)

(72) Inventor: Andrea Casali, Binasco (IT)

(73) Assignee: Cimbali Group S.p.A., Binasco (IT)

( * ) Notice: Subject to any disclaimer, the term of this patent is extended or adjusted under 35 U.S.C. 154(b) by 894 days.

(21) Appl. No.: 18/086,952

(22) Filed: Dec. 22, 2022

(65) Prior Publication Data

US 2023/0200582 A1 Jun. 29, 2023

(30) Foreign Application Priority Data

Dec. 23, 2021 (IT) ........................ 102021000032534

(51) Int. Cl.

*A47J 31/34* (2006.01)
*A47J 31/08* (2006.01)
*A47J 31/10* (2006.01)
*A47J 31/44* (2006.01)

(52) U.S. Cl.

CPC ............. *A47J 31/34* (2013.01); *A47J 31/085* (2013.01); *A47J 31/10* (2013.01); *A47J 31/4475* (2013.01)

(58) Field of Classification Search

CPC .......... A47J 31/34; A47J 31/085; A47J 31/10; A47J 31/4475; A47J 31/465; A47J 31/0631
USPC .................... 99/279, 287, 289 D, 289 P, 300
See application file for complete search history.

(56) References Cited

U.S. PATENT DOCUMENTS

| | | | | |
|---|---|---|---|---|
| RE7,793 | E * | 7/1877 | Kitchen | 366/149 |
| 3,324,551 | A * | 6/1967 | Muilk | A01J 15/12 426/664 |
| 4,550,027 | A | 10/1985 | Stone, Jr. | |
| 5,307,733 | A * | 5/1994 | Enomoto | A47J 31/545 99/305 |
| 9,737,168 | B2 | 8/2017 | Lee et al. | |
| 2015/0342396 | A1* | 12/2015 | De'Longhi | A47J 31/46 99/300 |
| 2017/0027370 | A1* | 2/2017 | James | A47J 31/12 |
| 2017/0251865 | A1* | 9/2017 | Clark | A47J 31/56 |

FOREIGN PATENT DOCUMENTS

| | | | | |
|---|---|---|---|---|
| CN | 107184098 | A * | 9/2017 | A47J 31/4403 |
| EP | 3494844 | A1 * | 6/2019 | A47J 31/4478 |

OTHER PUBLICATIONS

Search Report, Written Opinion dated Aug. 9, 2022; Application No. IT 102021000032534.

* cited by examiner

*Primary Examiner* — Edward F Landrum
*Assistant Examiner* — Theodore J Evangelista
(74) *Attorney, Agent, or Firm* — RANKIN, HILL & CLARK LLP; Erik J. Overberger

(57) ABSTRACT

The present disclosure concerns a coffee machine comprising a dispenser element configured to deliver hot water; feeding members in fluid communication with the dispensing element; a filter coffee dispensing unit comprising a tank arranged below the dispensing element along a longitudinal direction, configured to collect the hot water coming from the dispensing element, and having a discharge opening adapted to discharge the hot water accumulated in the tank by gravity into a hopper configured to accommodate a dose of ground coffee.

9 Claims, 3 Drawing Sheets

COFFEE MACHINE WITH DRIP COFFEE DISPENSING UNIT

TECHNICAL FIELD

The present disclosure relates to a coffee machine, in particular for the preparation of drip coffee, which is used in the field of technologies for the production of coffee-flavoured beverages.

STATE OF THE ART

In the state of the art, the preparation of the coffee-flavoured beverage called drip coffee, or more commonly American coffee or filtered coffee, has long been known. The preparation of this beverage is based on the principle of slowly filtering the hot water through a layer of ground coffee, placed in a paper filter. By percolation, the hot water dissolves the water-soluble substances contained in the ground coffee, transferring them into the beverage.

The practice of preparing drip coffee requires that a conical body (in technical jargon "dripper") is placed on a glass jug. Inside the conical body there is a filter, typically made of paper or metal, containing ground coffee. To obtain the drip coffee, the user pours hot water into the conical body, filled with ground coffee, at a temperature that does not compromise the organoleptic characteristics of the brew. Typically, the user when pouring water into the conical body, for example by means of a jug, imparts a rotary motion so that the water is poured along the entire circumferential wall of the conical body. By the action of gravity, the water percolates through the ground coffee in the filter, dissolving the water-soluble substances and, passing through the vertex of the conical body, reaches the underlying glass jug where it is accumulated.

In the state of the art, several coffee machines adapted to automate the process of extracting the coffee aromas mentioned above are known.

For example, document WO2020171469A1 discloses a machine for the preparation of drip coffee having a nozzle adapted to deliver pressurized hot water in a conical body containing ground coffee. This nozzle is fed by a pump and constrained on a pair of pins adapted to translate along two axes perpendicular to each other. In use, by acting on the pair of pins it is possible to move the nozzle to pour hot water at different points of the conical body.

Similarly, document KR101913340B1 discloses a machine for the preparation of drip coffee comprising a pump adapted to feed pressurized hot water to a movable nozzle placed above a conical body containing ground coffee. In use, the nozzle is configured to move along a horizontal axis and to rotate about a pin so as to reproduce the movement of the user.

The coffee machine illustrated in document KR101896838B1 differs from those of the above documents in that the hot water dispenser nozzle is obliged to rotate within a spiral track.

Further examples of coffee machines for the preparation of drip coffee having a movable nozzle are reported in documents US20210038014A1, U.S. Pat. No. 9,737,168B2, and KR20210106326A.

It should be noted that in order to obtain a complete extraction of the organoleptic properties from the ground coffee it is necessary that the hot water slowly percolates through it, so as to allow the complete dissolution of the water-soluble substances.

The machines known in the state of the art have dispenser nozzles, fed by pumping means, adapted to deliver pressurized hot water directly on the ground coffee. Thus, disadvantageously, the hot water is introduced into the conical body containing the ground coffee in the form of a pressurized flow, thereby forcing the filtration process and reducing the time for crossing the layer of ground coffee.

It is therefore evident that the machines known in the state of the art do not allow the complete extraction of the organoleptic properties of ground coffee to be obtained.

OBJECT OF THE DISCLOSURE

In this context, the technical task underlying the present disclosure is to propose a coffee machine for the preparation of drip coffee that overcomes the drawbacks of the prior art mentioned above.

In particular, it is an object of the present disclosure to provide a coffee machine for the preparation of filter coffee that is able to maximize the extraction of the organoleptic properties of the ground coffee.

SUMMARY OF THE INVENTION

The present disclosure relates to a coffee machine comprising a dispenser element configured to deliver hot water and feeding members adapted to supply hot water to the dispenser element.

The coffee machine subject-matter of the present disclosure further comprises a filter coffee dispensing unit having a tank, arranged below the dispensing element (1) along a longitudinal direction (X-X), and configured to collect the hot water coming from the dispensing element.

In detail, the tank has a discharge opening, so as to release by gravity, the hot water accumulated in the tank into a hopper configured to accommodate a dose of ground coffee.

It should be noted that the flow of pressurized hot water, delivered by the feeding members, by accumulating in the tank reaches the ambient pressure. Thus, the tank acts as a sort of "decompression chamber" adapted to release the pressure of the flow of water exiting the feeding members.

The hot water thus accumulated, which in accordance with the above is at ambient pressure, slowly outflows by gravity from the tank through the discharge opening, pouring over the dose of coffee loaded into the hopper.

Advantageously, the slow supply of hot water in the hopper allows its spontaneous percolation through the ground coffee and therefore the complete extraction of the organoleptic properties.

LIST OF FIGURES

Further characteristics and advantages of the present disclosure will become more apparent from the exemplary, and therefore non-limiting, description of a preferred but not exclusive embodiment of a coffee machine for the preparation of drip coffee, as illustrated in the appended drawings, wherein.

DETAILED DESCRIPTION

With reference to the accompanying Figures, the present disclosure relates to a machine 100 for the preparation of coffee-flavoured beverages, in particular drip coffee.

It should be specified that in the context of the present disclosure the term drip coffee refers to the coffee-flavoured beverage obtained by slow percolation by gravity of hot water through a dose of ground coffee collected in a special filter. The drip coffee is also commonly referred to as American coffee or even filtered coffee.

Figure 1:
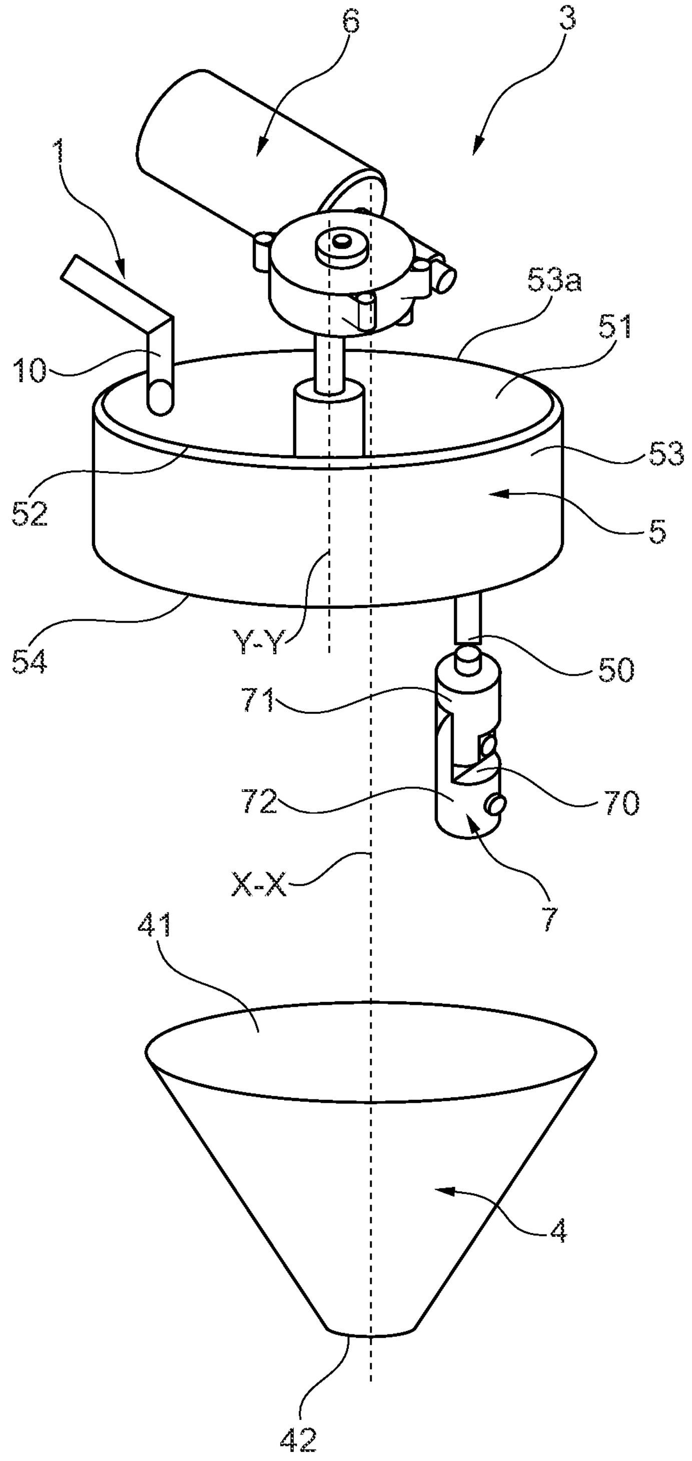
FIG. 1 shows a perspective view of the dispensing unit of the coffee machine according to the present disclosure.

In accordance with what is shown in FIG. 1, the machine 100 comprises a dispensing element 1 configured to deliver hot water.

Preferably, the dispensing element 1 is shaped as a conduit and has, at one end thereof, a nozzle 10 configured to deliver a flow of hot water. In a preferred embodiment, the nozzle 10 is of the converging type, i.e. it has an outlet cross-section smaller than the nominal one of the dispensing element 1, so as to accelerate the flow of hot water at the outlet. However, it should be specified that in alternative embodiments, the dispensing element 1 and the nozzle 10 may have the same cross-section.

The machine 100 subject-matter of the present disclosure further comprises feeding members 2 placed in fluid communication with the dispensing element to feed hot water to the dispensing element 1.

It is to be specified that in the context of the present disclosure feeding members 2 are understood to mean pumping means and heating means which, in combination, are configured to generate a flow of pressurized hot water. For example, as shown in FIG. 2, such feeding members 2 may comprise a pump 22 and a boiler 23 which are arranged in series.

Preferably, the feeding members 2 comprise, a valve body 24 adapted to interrupt the supply of hot water to the dispensing element 1. Even more preferably the valve body 24 comprises a solenoid valve commanded by a command board 83. More details on the command board and on the control of the valve body 24 will be provided below in the description.

Figure 2:
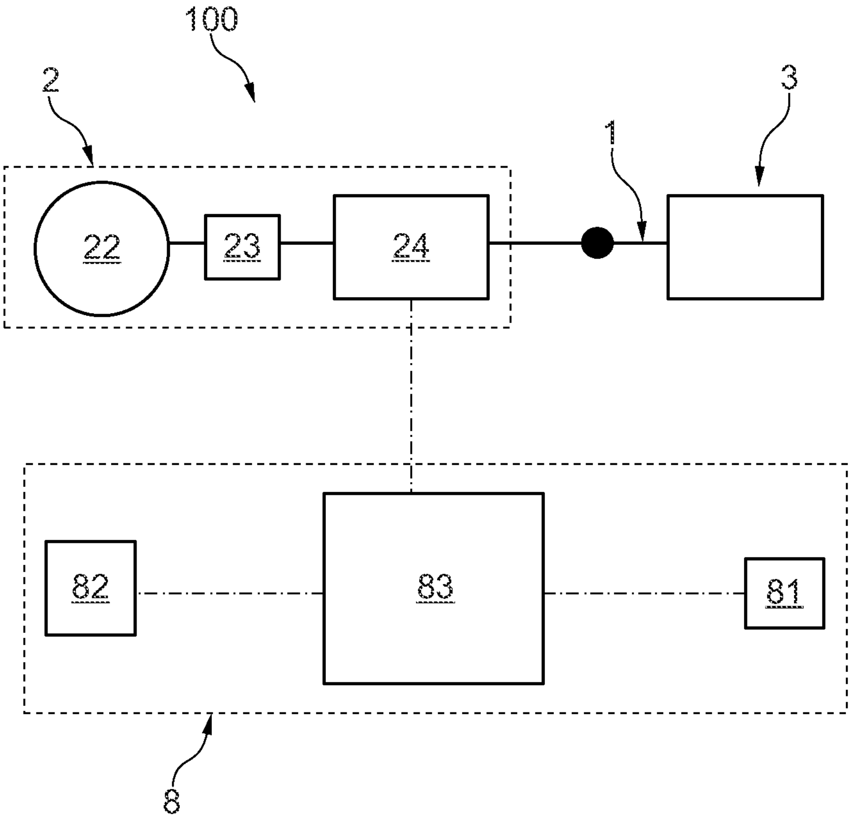
FIG. 2 shows a block scheme of the coffee machine subject-matter of the present disclosure.

As shown in FIG. 2 and detailed in FIG. 1, the machine 100 comprises a drip coffee dispensing unit 3, i.e. a dispensing unit configured for the preparation of the coffee-flavoured beverage referred to as drip coffee.

This dispensing unit 3 is in fluid communication with the dispensing element 1 to receive hot water at the inlet. In other words, the dispensing unit 3 is arranged downstream of the dispensing element 1 so as to receive the hot water delivered by the latter.

The dispensing unit 3 comprises a tank 5 arranged below the dispensing element 1 along a longitudinal direction X-X and configured to collect the hot water coming from the dispensing element 1. More details on the tank and its geometry will be provided below in the description.

FIG. 1 shows a hopper 4 configured to accommodate a dose of ground coffee. It should be specified that this hopper 4 is not part of the machine 100 subject-matter of the present disclosure, but is an external element that can be positioned by a user under the dispensing unit 3.

In detail, in a configuration of use, the hopper 4 is arranged below the tank 5, which will then be interposed between the dispensing element 1 and the hopper 4 along the longitudinal direction X-X. Therefore, in the configuration of use the tank 5 is placed downstream of the dispensing element 1 and upstream of the hopper 4.

For convenience, in the following description and in the accompanying Figures reference is made to the aforementioned condition of use.

In the context of the present disclosure, the term hopper 4 means a container, preferably with inclined walls, which can be used to contain inconsistent materials, namely ground coffee.

In detail, again with reference to FIG. 1, the hopper 4 has an inlet opening 41 adapted to receive hot water at the inlet, and an outlet opening 42 adapted to deliver drip coffee. In greater detail, the inlet and outlet opening 41, 42 are spaced along the longitudinal direction X-X and the hopper 4 is configured to accommodate the dose of coffee therebetween. Typically, the dose of coffee is arranged in a paper or metal filter insertable into the hopper between the inlet and outlet opening 41, 42.

Preferably, at least one between the inlet and outlet opening 41, 42 of the hopper 4 is oriented orthogonally to the longitudinal direction X-X. In the embodiment shown in FIG. 1, both the inlet opening 41 and the outlet opening 42 are oriented transversely to the longitudinal direction X-X.

Furthermore, preferably, the hopper 4 has a geometry tapered from the inlet opening 41 towards the outlet opening 42, so that the outlet opening 42 has a smaller cross-section than the inlet opening 41. For example, the hopper 4 is truncated conical or truncated pyramidal in shape with the inlet 41 and outlet 42 openings which are arranged respectively at the major base and at the minor base thereof of the truncated cone or truncated pyramid.

As shown in FIG. 1, the tank 5 comprises a discharge opening 50 configured to discharge by gravity the hot water accumulated in the tank 5 into the hopper 4. More precisely, in the configuration of use, the discharge opening 50 of the tank 5 is aligned with the inlet opening 41 of the hopper 4 along the longitudinal direction X-X, so that the hot water outflowing by gravity from the tank 5 falls into the hopper 4 passing through the inlet opening 41.

It should be noted that, in use, the hot water after having been delivered by the dispensing element 1 into the tank 5 and having accumulated in the latter, outflows from the discharge opening 50 and falls into the inlet opening 41 of the hopper 4 by the action of the force of gravity.

The tank 5 therefore acts as a sort of "decompression chamber" adapted to allow the flow of pressurized hot water delivered by the dispensing elements 1 to rest. In fact, the flow of pressurized hot water arriving in the tank 5, and accumulated there, reaches the ambient pressure so as to slowly outflow from the discharge opening 50 by the action of the force of gravity. The slow supply of the hot water in the inlet opening 41 of the hopper 4, guarantees its spontaneous percolation by gravity through the ground coffee accommodated in the hopper, and therefore the complete extraction of the organoleptic properties of the coffee.

Preferably, the discharge opening 50 of the tank 5 faces the inlet opening 41 of the hopper 4 along the longitudinal direction X-X and is configured to discharge, or rather drip, the hot water accumulated in the tank 5 onto the dose of coffee that can be accommodated in the hopper 4.

Even more preferably, the discharge opening 50 of the tank 5 has an axis oriented parallel to the longitudinal direction X-X. In other words, the discharge opening 50 of the tank 5 is oriented transversely to the longitudinal direction X-X. In the condition of use, preferably the inlet opening 41 of the hopper 4 is oriented parallel to the discharge opening 50 of the tank 5.

In detail, preferably, as shown in FIG. 1, the tank 5 has a chamber 51 adapted to collect the hot water coming from the dispensing element 1, and a filling opening 52 adapted to allow the introduction of hot water into the chamber 51. Preferably, the filling opening 52 is oriented transversely to the longitudinal direction X-X, i.e. it has an axis parallel to the latter.

Furthermore, preferably, the tank 5 comprises a side wall 53, perimetrically delimiting the chamber 51 of the tank 5. Even more preferably, the side wall has an edge 53*a* defining the filling opening 52.

Furthermore, preferably, the tank 5 comprises a bottom 54, opposite the filling opening 52 and delimiting the chamber 51 along the longitudinal direction X-X. In detail, the bottom 54 extends mainly orthogonally to the longitudinal direction X-X joining the side wall 53.

In accordance with what is shown in the embodiment of FIG. 1, preferably, the nozzle 10 of the dispensing element 1 is configured to generate a flow of hot water which, when introduced into the tank 5, laps the side wall 53 and then accumulates on the bottom 54. Even more preferably, the nozzle 10 is partially arranged in the chamber 51 near the side wall 53.

Preferably, the discharge opening 50 extends along the longitudinal direction X-X by passing entirely through the bottom 54 of the tank 5 thus creating a through hole that places the chamber 51 in fluid communication with the inlet opening 41 of the hopper 4.

Furthermore, preferably, the discharge opening 50 of the tank 5 has a cross-section—fluid passage clearance—having a smaller extension than that of the nozzle 10 of the dispensing element 1. This ensure that at least part of the hot water introduced into the tank 5 will accumulate in it before being poured into the inlet opening 41 of the hopper 4.

With reference to FIG. 1, preferably, the machine 100 comprises motorisation elements 6 kinematically connected to the tank 5, and configured to rotate it about a rotation axis Y-Y. In detail, the motorisation elements 6 are configured to change the position of the discharge opening 50 of the tank 5 with respect to the hopper 4, so as to pour the hot water on different regions of the ground coffee. In other words, in use, the motorisation elements 6 are configured to move the discharge opening 50 of the tank 5 relative to the inlet opening 41 of the hopper 4 to homogeneously irrigate the ground coffee.

Preferably, the rotation axis Y-Y is oriented parallel to the longitudinal direction X-X. More preferably, the tank 5 and the hopper 4 are arranged so that the rotation axis Y-Y of the tank 5 passes through a central portion of the inlet opening 41 of the hopper 4. In this way, the motorisation elements 6, when driven, move the discharge opening 50 along a circumferential path around the central portion of the inlet opening 41 of the hopper 4 ensuring a homogeneous distribution of the hot water on the ground coffee.

The inlet opening 41 of the hopper 4 can have different dimensions, in particular it can have a diameter between 80 mm and 150 mm. Therefore, to allow the installation of the same tank 5 in machines having hoppers 4 with different dimensions, the machine 100 subject-matter of the present disclosure comprises directing elements 7 configured to direct the hot water exiting from the discharge opening 50 of the tank 5 towards the inlet opening 41 of the hopper 4.

In a preferred embodiment, the directing elements 7 comprise an articulated portion 70.

The directing elements 7 are connected to the tank 5 at the discharge opening 5, and are configured to be interposed between the tank 5 and the inlet opening 41 of the hopper 4 along the longitudinal direction X-X. Preferably, the directing elements 7 are connected to the bottom 54 of the tank 5 so as to channel the hot water outflowing from the discharge opening 50 into the inlet opening 41 of the hopper.

Preferably, the directing elements 7 comprise a first conduit 71 connected to the bottom 54 of the tank 5, and a second conduit 72 connected to the first conduit 71 by means of the articulated portion 70. The hot water outflowing from the discharge opening 50 of the tank 5 flows into the inlet opening 41 of the hopper 4 passing in succession through the first conduit 71, the articulated portion 70 and the second conduit 72. By acting on the articulated portion 70 it is possible to change the relative position of the second conduit 72 with respect to the first conduit 71 so as to correctly direct the hot water into the inlet opening 41.

Figure 3:
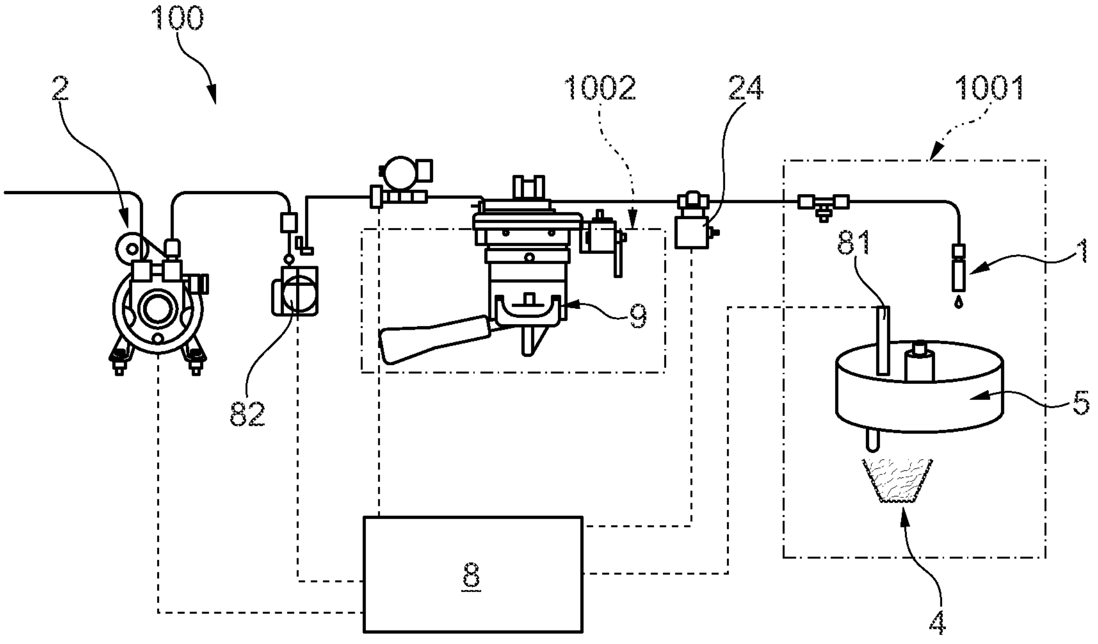
FIG. 3 shows a diagram of the hydraulic and electronic circuit of the coffee machine according to the present disclosure.

Preferably, as shown in FIGS. 2 and 3, the machine 100 subject-matter of the present disclosure comprises a control system 8 for controlling the filling of the tank 5 configured to control the actuation of the hot water feeding members 2.

Preferably, the control system 8 acts directly on the valve body 24 of the feeding members 2 to selectively open and close the flow of hot water delivered by the dispensing element 1 into the tank 5.

The control system 8 comprises at least one filling sensor 81 arranged in the tank 8 to detect the level of the free surface of the water accumulated in the tank 5, and a flowmeter 82 arranged upstream of the dispensing unit 3 to measure the volume of water supplied by the feeding members 2 to the dispensing element 1.

Preferably, the control system 8 comprises a control board 83 placed in signal communication with the valve body 24, the filling sensor 81 and the flowmeter 82. The control board 83 based on the measurements of the filling sensor 81, or of the flowmeter 82, or of both is configured to send an actuation signal to the valve body 24 to allow or inhibit the delivery of hot water from the dispensing element 1.

In a first embodiment, the control board 83 controls the closing of the valve body 24 based on the volume of hot water measured by the flowmeter 82. In detail, the control board 83 sends a command to close the valve body 24 when the flowmeter 82 has detected the passage of a predetermined volume of hot water.

In a second embodiment, the control board 83 controls the opening or the closing of the valve body 24 based on the level of the free water surface in the tank 5 measured by the filling sensor 81. In detail, the control board 83 sends a closing command of the valve body 24 when the level of the free water surface detected by the filling sensor 81 is equal to a limit value.

In a third embodiment, the control board 83 may be configured to drive the closing and opening of the valve body 24 based on time intervals. For example, the control board 83 may be configured to leave the valve body 24 open for a predetermined time interval.

Preferably, with reference to FIG. 3, the machine 100 object of the present disclosure comprises a drip coffee dispensing zone for 1001 comprising a drip coffee dispensing unit 3 in accordance with what is described above, and an espresso dispensing zone for espresso coffee 1002, distinct from the dispensing zone for drip coffee 1001, comprising an espresso coffee dispensing unit 9.

In the context of the present disclosure, an espresso coffee dispensing unit 9 is intended as a dispensing unit for coffee machines adapted to deliver the coffee-flavoured beverage commonly referred to as espresso coffee. It should be noted that espresso coffee dispenser unit 9 have been well known to the person skilled in the art for some time, therefore they will not be described in detail.

In a possible embodiment shown in FIG. 3, the espresso coffee dispensing unit 9 is placed in fluid communication with the same feeding members 2 of the drip coffee dispensing unit 3.

In particular, the espresso coffee dispensing unit 9 is arranged downstream of the feeding members 2 and upstream of the drip coffee dispensing unit 3.

As shown in FIG. 3, in the event that the machine 100 is configured to deliver both espresso coffee and drip coffee, the valve body 24 is arranged downstream of the espresso dispensing unit 9 and upstream of the drip coffee dispensing unit 3. When the valve body 24 is closed and the feeding members 2 are actuated, the hot water will then be supplied to the espresso dispensing unit 9, conversely when the valve body 24 is open, the hot water will reach the filter coffee dispensing unit 3.

In an alternative embodiment, the machine 100 may comprise dedicated pressurized hot water dispensing members, and thus distinct hydraulic paths, for each dispensing unit 3, 9.

Advantageously, the machine 100 subject-matter of the present disclosure makes it possible to realise a coffee machine adapted to deliver coffee-flavoured beverages both of espresso type and drip coffee type.

The invention claimed is:

1. A coffee machine which comprises:

a dispensing element configured to dispense hot water;

feeding members in fluid communication with the dispensing element to feed hot water to the dispensing element; and a dispensing unit in fluid communication with the dispensing element to receive hot water from the dispensing element;

wherein the dispensing unit comprises a tank arranged below the dispensing element along a longitudinal direction and configured to collect the hot water coming from the dispensing element, said tank having a discharge opening configured to discharge the hot water accumulated in the tank by gravity into a hopper configured to accommodate a dose of ground coffee, and wherein the coffee machine further comprises directing elements, the directing elements comprising an articulated portion and being configured to direct the hot water discharged from the discharge opening of the tank towards the hopper, the directing elements being:

connected to the tank at the discharge opening, and configured to be interposed between the tank and the hopper along the longitudinal direction.

2. The coffee machine according to claim 1, wherein the tank is interposed between the dispensing element and the hopper along the longitudinal direction, when said hopper is arranged below the tank.

3. The coffee machine according to claim 1, wherein the discharge opening of the tank is configured to face the hopper along the longitudinal direction so as to be able to discharge the hot water accumulated in the tank by gravity on the dose of ground coffee that can be accommodated in the hopper.

4. The coffee machine according to claim 1, wherein the discharge opening of the tank has an axis oriented parallel to the longitudinal direction.

5. The coffee machine according to claim 1, wherein the tank comprises:

a chamber adapted to collect the hot water coming from the dispensing element; and a filling opening adapted to allow the introduction of hot water into the chamber, said filling opening having an axis oriented parallel to the longitudinal direction.

6. The coffee machine according to claim 5, wherein:

the tank comprises a side wall perimetrically delimiting the chamber of the tank;

the dispensing element has a nozzle configured to generate a flow of water that laps the side wall of the tank.

7. The coffee machine according to claim 5, wherein:

the tank comprises a bottom opposite the filling opening and delimiting the chamber along the longitudinal direction;

the discharge opening extends along the longitudinal direction through the bottom of the tank so as to put the chamber of the tank in fluid communication with the hopper.

8. The coffee machine according to claim 1 comprising a tank filling control system configured to control the actuation of the feeding members, said tank filling control system comprising at least one between a filling sensor arranged in the tank to detect the level of hot water accumulated in the tank, and a flowmeter adapted to measure the flow rate of water fed by the feeding members to the dispensing element.

9. The coffee machine according to claim 1 comprising:

a drip coffee dispensing zone comprising the dispensing unit;

an espresso dispensing zone, distinct from the drip coffee dispensing zone, comprising at least an espresso dispensing unit in fluid communication with the feeding members to receive hot water and deliver espresso coffee.

* * * * *